United States Patent [19]  
Yamaoka et al.

[11] Patent Number: 4,722,973  
[45] Date of Patent: Feb. 2, 1988

[54] THERMOPLASTIC ELASTOMER COMPOSITION

[75] Inventors: Noboru Yamaoka, Yokohama; Kiyoyasu Tanabe, Tokyo; Katumi Usui; Takashi Mizoe, both of Yokohama; Kazuo Matsuura, Tokyo, all of Japan

[73] Assignee: Nippon Oil Co., Ltd., Japan

[21] Appl. No.: 847,430

[22] Filed: Apr. 2, 1986

[30] Foreign Application Priority Data

Apr. 10, 1985 [JP] Japan .................................. 60-74352
Apr. 22, 1985 [JP] Japan .................................. 60-84393

[51] Int. Cl.$^4$ ........................ C08L 23/16; C08L 23/18
[52] U.S. Cl. .................................... 525/240; 525/211; 525/193; 525/194
[58] Field of Search ................ 525/193, 240, 194, 211

[56] References Cited

U.S. PATENT DOCUMENTS 3,806,558  4/1974  Fischer ................................ 525/240
4,426,498  1/1984  Inoue et al. ......................... 525/240
4,429,079  1/1984  Shibata et al. ...................... 525/240
4,576,993  3/1986  Tamplin et al. ..................... 525/240

FOREIGN PATENT DOCUMENTS 52-039741   3/1977   Japan .
57-059943   4/1982   Japan .
58-002339A  1/1983   Japan .
2077273    12/1981   United Kingdom .

Primary Examiner—Carman J. Seccuro  
Attorney, Agent, or Firm—McGlew and Tuttle

[57] ABSTRACT

This invention provides a thermoplastic elastomer composition obtained by blending (A) a hard segment comprising a low-density ethylene-α-olefin copolymer formed by copolymerizing ethylene with an α-olefin by the use of a specific catalyst and characterized by specifically defined properties and (B) a soft segment comprising an ethylene-α-olefin copolymer rubber, or obtained by partial cross-linking of the resulting blend.

This elastomer composition has characteristic features such as high flexibility, good fluidity, excellent tensile properties, good thermal resistance and oil resistance and low permanent strain.

9 Claims, No Drawings

THERMOPLASTIC ELASTOMER COMPOSITION

BACKGROUND OF THE INVENTION

1. Field of the Invention

This invention relates to a novel thermoplastic elastomer composition. More particularly, it relates to a thermoplastic elastomer composition obtained by blending a very-low-density ethylene copolymer, formed by copolymerizing ethylene with an α-olefin by the use of a specific catalyst, with an ethylene-α-olefin copolymer rubber, and to a thermoplastic elastomer composition obtained by partial cross-linking of the aforesaid blend.

2. Description of the Prior Art

Among polyolefin-based thermoplastic elastomer, blends of a hard segment comprising a crystalline polyolefin such as polyethylene or polypropylene and a soft segment comprising an amorphous copolymer rubber such as ethylene-propylene copolymer rubber (EPR) or ethylene-propylene-unconjugated diene copolymer rubber (EPDM), and compositions obtained by partial cross-linking of such blends are known. In addition, the method of synthesizing a hard segment and a soft segment by multistage polymerization is also known. Various grades of compositions ranging from flexible to rigid are being produced by varying the proportions of each segment.

Flexible grade compositions are attracting much attention because they are rubber-like materials which can be used in wide applications including automobile parts, hoses, wire coverings and packings. In the production of such flexible grade compositions, it is necessary to increase the proportion of the soft segment (such as EPR or EPDM) and decrease the proportion of the hard segment (such as polyethylene or polypropylene).

However, since soft segments such as EPR and EPDM have low tensile strength and are poor in thermal resistance, fluidity and oil resistance, flexible thermoplastic elastomers containing such a soft segment in high proportions also have the aforesaid disadvantages and cannot be used in a wide variety of applications. If the proportion of the soft segment is increased so as to solve these problems, the resulting composition will lack flexibility, show a reduction in such properties as permanent set, and fail to perform its function as a flexible thermoplastic elastomer.

Where a flexible grade composition is synthesized by multistage polymerization, the hard segment and the soft segment must be synthesized separately, so that not only a very complicated apparatus is required, but also it is very difficult to control the properties and proportion of each segment at each polymerization stage. Moreover, a defective product may result at the time of switchover from one grade to another. Further, it is very difficult to recover the resulting polymer because it contains a large amount of rubber-like material.

As described above, many problems must be solved before a flexible thermoplastic elastomer of good quality can be produced.

SUMMARY OF THE INVENTION

It is an object of the present invention to provide a thermoplastic elastomer composition having characteristic features such as high flexibility, good fluidity, excellent tensile properties, excellent thermal resistance and oil resistance and low permanent set.

It is another object of the present invention to provide a thermoplastic resin composition which has the aforesaid excellent properties and can be produced without requiring to any complicated manufacturing process.

According to the present invention, there is provided a thermoplastic elastomer composition comprising
(A) 10 to 90% by weight of an ethylene-α-olefin copolymer formed by copolymerizing ethylene with an α-olefin having 3 to 12 carbon atoms in the presence of catalyst consisting of (1) a solid component containing at least magnesium and titanium, and (2) an organoaluminum compound, said ethylene-α-olefin copolymer being characterized by
  (I) a melt index of 0.01 to 100 g/10 min,
  (II) a density of 0.860 to 0.910 g/cm$^3$,
  (III) a maximum peak temperature of not lower than 100° C. as measured by differential scanning calorimetry (DSC), and
  (IV) a boiling-n-hexane-insoluble fraction of not less than 10% by weight; and
(B) 90 to 10% by weight of an ethylene-α-olefin copolymer rubber.

The aforesaid components (A) and (B) may be partially cross-linked to each other.

DETAILED DESCRIPTION OF THE PREFERRED EMBODIMENTS

In the preparation of the ethylene-α-olefin copolymer (A) used in the present invention, an α-olefin having 3 to 12 carbon atoms is copolymerized with ethylene. Specific examples of such α-olefins include propylene, butene-1, 4-methylpentene-1, hexene-1, octene-1, decene-1 and dodecene-1. Among them, α-olefins having 3 to 6 carbon atoms (i.e., propylene, butene-1, 4-methylpentene-1 and hexene-1) are especially preferred. In addition, dienes such as butadiene and 1,4-hexadiene may be used as comonomers. The ethylene-α-olefin copolymer should preferably have an α-olefin content of 5 to 40 mole %.

The aforesaid ethylene-α-olefin copolymer (A) used in the present invention can be prepared in the following manner.

First, the catalyst system used for this purpose should comprise a combination of (1) a solid catalyst component containing at least magnesium and titanium, and (2) an organoaluminum compound. The solid catalyst component may comprise a titanium compound supported on a magnesium-containing inorganic solid compound in any well-known manner. Useful magnesium-containing inorganic solid compounds include, for example, metallic magnesium; magnesium hydroxide; magnesium oxide; magnesium salts such as magnesium carbonate and magnesium chloride; double salts, double oxides, carbonates, chlorides and hydroxides containing both magnesium and a metal selected from silicon, aluminum and calcium; the products obtained by treating or reacting these inorganic solid compounds with an oxygen-containing compound, a sulfur-containing compound, an aromatic hydrocarbon or a halogen-containing material.

Oxygen-containing compounds useful for the aforesaid purpose include, for example, water; organic oxygen-containing compounds such as alcohols, phenols, ketones, aldehydes, carboxylic acids, esters, polysiloxane and acid amides; and inorganic oxygen-containing compounds such as metal alkoxides and metal oxychlorides. Useful sulfur-containing compounds include, for example, organic sulfur-containing compounds such as thiols and thioethers; and inorganic sulfur-containing compounds such as sulfur dioxide, sulfur trioxide and sulfuric acid. Useful aromatic hydrocarbons include, for example, a variety of monocyclic and polycyclic aromatic hydrocarbon compounds such as benzene, toluene, xylene, anthracene and phenanthrene. Useful halogen-containing materials include, for example, such compounds as chlorine, hydrogen chloride, metal chlorides and organic halides.

The titanium compound supported on the magnesium-containing inorganic solid compound may be selected from, for example, titanium halides, titanium alkoxyhalides, titanium alkoxides and halogenated titanium oxides. Among others, tetravalent titanium compounds and trivalent titanium compounds are preferred. Preferred tetravalent titanium compounds are those represented by the general formula $Ti(OR)_m X_{4-m}$ where R is an alkyl, aryl or aralkyl of 1 to 20 carbon atoms, X is a halogen atom, and m is a whole number equal to 0 to 4, and specific examples thereof include titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisoproxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium. Useful trivalent titanium compounds include titanium trihalides obtained by reducing titanium tetrahalides, such as titanium tetrachloride, titanium tetrabromide, etc., with hydrogen, aluminum, titanium or any of organometallic compounds of the group I-III metals. Also useful are trivalent titanium compounds obtained by reducing tetravalent alkoxytitanium halides of the general formula $Ti(OR)_n X_{4-n}$ with any of organometallic compounds of the group I-III metals. In the above formula, R is an alkyl, aryl or aralkyl group of 1 to 20 carbon atoms, X is a halogen atom, and n is $0 < n < 4$.

Among these titanium compounds, tetravalent titanium compounds are especially preferred.

Specific and preferred examples of the above-described catalyst system include those obtained by selecting a solid catalyst component from among MgO—RX—TiCl$_4$ (Japanese Patent Publication No. 3514/'76), Mg—SiCl$_4$—ROH—TiCl$_4$ (Japanese Patent Application No. 23864/'75), MgCl$_2$—Al(OR)$_3$—TiCl$_4$ (Japanese Patent Publication Nos. 152/'76 and 15111/'77), MgCl$_2$—SiCl$_4$—ROH—TiCl$_4$ (Japanese Patent Laid-Open No. 106581/'74), Mg(OOCR)$_2$—Al(OR)$_3$—TiCl$_4$ (Japanese Patent Publication No. 11710/'77), Mg—POCl$_3$—TiCl$_4$ (Japanese Patent Publication No. 153/'76), MgCl$_2$—AlOCl—TiCl$_4$ (Japanese Patent Publication No. 15316/'79) and MgCl$_2$—Al(OR)$_n$X$_{3-n}$—Si(OR)$_m$X$_{4-m}$—TiCl$_4$ (Japanese Patent Laid-Open No. 95909/'81), and combining it with an organoaluminum compound. In the above formulas, R and R' are organic radicals and X is a halogen atom.

Another useful catalyst system is a combination of (1) a solid catalyst component comprising the reaction product of an organomagnesium compound (such as Grignard compound) with a titanium compound, and (2) an organoaluminum compound. As the organomagnesium compound, there may be used, for example, organomagnesium compounds of the general formulas RMgX, R$_2$Mg and RMg(OR) where R is an organic radical having 1 to 20 carbon atoms, and X is a halogen atom; complexes of such organomagnesium compounds with ethers; and such organomagnesium compounds further modified by the addition of other organometallic compounds such as organosodium compounds, organolithium compounds, organopotassium compounds, organoboron compounds, organocalcium compounds and organozinc compounds.

Specific examples of this catalyst system include those obtained by selecting a solid catalyst component from among RMgX—TiCl$_4$ (Japanese Patent Publication No. 39470/'75), RMgX—phenol—TiCl$_4$ (Japanese Patent Publication No. 12953/'79), RMgX—halogenated phenol—TiCl$_4$ (Japanese Patent Publication No. 12954/'79) and RMgX—CO$_2$—TiCl$_4$ (Japanese Patent Laid-Open No. 73009/'82), and combining it with a organoaluminum compound.

Still another useful catalyst system is a combination of (1) a solid material obtained by bringing an inorganic oxide, such as SiO$_2$ or Al$_2$O$_3$, into contact with the aforesaid solid catalyst component containing at least magnesium and titanium, and (2) an organoaluminum compound. In addition to SiO$_2$ and Al$_2$O$_3$, useful inorganic oxides include CaO, B$_2$O$_3$ and SnO$_2$, and double oxides thereof may also be used without any difficulty. The contact of these various inorganic oxides with the solid catalyst component containing magnesium and titanium may be effected according to any well-known method. Specifically, this can be accomplished by reacting them, in the presence or absence of an inert solvent, at a temperature of 20° to 400° C., preferably 50° to 300° C., for a period of time usually ranging from 5 minutes to 20 hours, by copulverizing them, or by a suitable combination of these methods.

Specific examples of this catalyst system include those obtained by selecting a solid catalyst component from among SiO$_2$—ROH—MgCl$_2$—TiCl$_4$ (Japanese Patent Laid-Open No. 47407/'81), SiO$_2$—R—O—R'—MgO—AlCl$_3$—TiCl$_4$ (Japanese Patent Laid-Open No. 187305/'82) and SiO$_2$—MgCl$_2$—Al(OR)$_3$—TiCl$_4$—Si(OR')$_4$ (Japanese Patent Laid-Open No. 21405/'83), and combining it with an organoaluminum compound. In the above formulas, R and R' are hydrocarbon radicals.

In these catalyst systems, the titanium compound may be used as an addition product with an organic carboxylic acid ester, and the aforesaid inorganic solid compound containing magnesium may be used after having been brought into contact with an organic carboxylic acid ester. Moreover, it is not precluded to use the organoaluminum compound as an addition product with an organic carboxylic acid ester. Further, it is perfectly feasible in all cases to use a catalyst system prepared in the presence of an organic carboxylic acid ester.

Organic carboxylic acid esters useful for this purpose include a variety of aliphatic, alicyclic and aromatic carboxylic acid esters, though aromatic carboxylic acid esters having 7 to 12 carbon atoms are preferred. Specific examples thereof include alkyl esters (such as methyl and ethyl esters) of benzoic acid, anisic acid and toluic acid.

The organoaluminum compound used in combination with the aforesaid solid catalyst component is preferably selected from the compounds represented by the general formulas $R_3Al$, $R_2AlX$, $RAlX_2$, $R_2AlOR$, $RAl(OR)X$ and $R_3Al_2X_3$ where R is an alkyl, aryl or aralkyl group of 1 to 20 carbon atoms, X is a halogen atom, and two or more R groups may be the same or different. Specific examples thereof include triethylaluminum, triisobutylaluminum., trihexylaluminum, trioctylaluminum, diethylaluminum chloride, diethylaluminum ethoxide, ethylaluminum sesquichloride and mixtures thereof.

Although the amount of organoaluminum compound used is not critical, it is usually used in an amount of 0.1 to 1000 moles per mole of the titanium compound.

The polymerization activity of the aforesaid catalyst system can be greatly enhanced by bringing it into contact with an α-olefin and then using it in the polymerization reaction. Thus, a stabler polymerization can be effected as compared with the case in which the catalyst system is used without any treatment. Although various α-olefins can be used for this purpose, α-olefins having 3 to 12 carbon atoms are preferred and α-olefins having 3 to 8 carbon atoms are more preferred. Specific examples of these α-olefins include propylene, butene-1, pentene-1, 4-methylpentene-1, hexene-1, octene-1, decene-1 and dodecene-1, as well as mixtures thereof. The temperature and time used for the treatment of the catalyst system with an α-olefin can vary widely. For example, the catalyst system may be treated with an α-olefin at a temperature of 0° to 200° C., preferably 0° to 110° C., for a period of time ranging from 1 minute to 24 hours. The amount of α-olefin used can also vary widely. However, it is usually desirable to treat each gram of the aforesaid solid catalyst component with about 1 to 50,000 g, preferably about 5 to 30,000 g, of an α-olefin and thereby react each gram of the aforesaid solid catalyst component with 1 to 500 g of the α-olefin. Although this treatment may be carried out under any desired pressure, it is usually desirable to use a pressure ranging from $-1$ to 100 kg/cm$^2$·G.

In the treatment with an α-olefin, the aforesaid solid catalyst component may be combined with all of the organometallic component to be used and then brought into contact with the α-olefin. Alternatively, the aforesaid solid catalyst component may be combined with a part of the organoaluminum compound to be used and then brought into contact with the α-olefin, the remainder of the organoaluminum compound being separately added to the polymerization system. Moreover, not only hydrogen gas but also inert gases such as nitrogen, argon and helium may be present during the contact of the catalyst system with α-olefin.

The polymerization reaction is carried out in the same manner as the polymerization of olefins by the use of a common Ziegler catalyst. Specifically, while the polymerization system is maintained in a substantially oxygen-free and water-free state, the polymerization reaction is carried out in the vapor phase, in the presence of an inert solvent, or by using the monomer mixture as the solvent. The conditions for the polymerization of olefins are such that the temperature ranges from 20° to 300° C., and preferably from 40° to 200° C., and the pressure ranges from atmospheric pressure to 70 kg/cm$^2$·B, and preferably from 2 kg/cm$^2$·G to 60 kg/cm$^2$·G. Although the molecular weight can be controlled to some extent by varying polymerization conditions such as polymerization temperature and the molar ratio of catalyst components, this may be more effectively accomplished by adding hydrogen to the polymerization system. It is to be understood that the polymerization reaction may be carried out, without any difficulty, in two or more steps different in polymerization condition such as hydrogen concentration and polymerization temperature.

The ethylene-α-olefin copolymer (A) synthesized in the above-described manner should have a melt index (MI), as determined according to JIS K6760, of 0.01 to 100 g/10 min, and preferably 0.1 to 50 g/10 min. Its density, as determined according to JIS K6760, should be from 0.860 to 0.910 g/cm$^3$, preferably from 0.870 to 0.910 g/cm$^3$, and more preferably from 0.870 to 0.900 g/cm$^3$. Its maximum peak temperature (Tm), as measured by differential scanning calorimetry (DSC), should not be lower than 100° C. and preferably not lower than 110° C. Its boiling-n-hexane-insoluble fraction should not be less than 10% by weight, preferably from 20 to 95% by weight, and more preferably from 20 to 90% by weight.

If the MI of the ethylene-α-olefin copolymer (A) is less than 0.01 g/10 min., the resulting thermoplastic elastomer composition will have an unduly low MI and exhibit poor fluidity, while if the MI is greater than 100 g/10 min., the resulting composition will undesirably show a reduction in tensile strength. If the density is less than 0.860 g/cm$^3$, the resulting composition will show a reduction in tensile strength, have sticky surfaces, and present a poor appearance, while if the density is greater than 0.910 g/cm$^3$, the resulting composition will undesirably show a loss in fluidity and transparency. If the maximum peak temperature as measured by DSC is lower than 100° C., the resulting composition will undesirably show a reduction in tensile strength, have sticky surfaces, and suffer a loss in thermal resistance and oil resistance. If the boiling-n-hexane-insoluble fraction is less than 10% by weight, the resulting composition will undesirably show a reduction in tensile strength and have sticky surfaces.

The ethylene-α-olefin copolymer rubber (B) constituting another component used in the thermoplastic elastomer composition of the present invention is an ethylene-α-olefin copolymer rubber or an ethylene-α-olefin-unconjugated diene copolymer rubber. These copolymer rubbers are amorphous copolymers.

Specific examples of the α-olefin present in the ethylene-α-olefin copolymer rubber (B) include propylene, butene-1, pentene-1, 4-methylpentene-1, hexene-1 and octene-1. Among them, propylene is especially preferred.

Specific examples of the unconjugated diene include 1,4-hexadiene, 1,6-octadiene, dicyclopentadiene, vinylnorborene and ethylidenenorbornene. Among them, 1,4-hexadiene and ethylidenenorbornene are preferred.

The ethylene-α-olefin copolymer rubber (B) used in the present invention should preferably have a Mooney viscosity (ML$_{1+4}$, 100° C.) of 10 to 120, and more preferably 20 to 110. If the Mooney viscosity of the ethylene-α-olefin copolymer rubber (B) is less than 10, the resulting thermoplastic elastomer composition will undesirably show a reduction in tensile strength and sticky surfaces. If the Mooney viscosity is greater than 120, the resulting thermoplastic elastomer composition will undesirably exhibit poor fluidity.

The ethylene-α-olefin copolymer (A) and the ethylene-α-olefin copolymer rubber (B), which constitute the thermoplastic elastomer composition of the present invention, can be readily distinguished from each other. Even though they are composed of the same monomers and have the same density, the component (A) has a much higher maximum peak temperature as measured by DSC and the component (B) has a maximum peak temperature, if any, of at most 60° to 70° C. As to the boiling-n-hexane-insoluble fraction, the component (B) contains no or very little, if any, insoluble matter. Moreover, the methods for preparing these components are quite different. Specifically, the component (A) is preferred, as described above, by the use of a catalyst containing magnesium and titanium, whereas the component (B) is usually prepared by the use of a vanadium-based catalyst.

In the thermoplastic elastomer composition of the present invention, the proportion of the ethylene-α-olefin copolymer (A) to the ethylene-α-olefin copolymer rubber (B) should be such that the weight ratio of (A)/(B) is in the range of 90/10 to 10/90, and preferably in the range of 75/25 to 25/75.

If the amount of the ethylene-α-olefin copolymer (A) is greater than 90% by weight, the resulting thermoplastic elastomer composition will lack in flexibility and have poor permanent set, while if it is less than 10% by weight, the resulting composition will undesirably show a reduction in tensile strength and have poor oil resistance.

In forming the thermoplastic elastomer composition of the present invention, a mixture of an ethylene-α-olefin copolymer rubber and an ethylene-α-olefin-unconjugated diene copolymer rubber may also be used as the soft segment, i.e., the ethylene-α-olefin copolymer rubber (B).

Moreover, as long as the performance desired for the thermoplastic elastomer composition of the present invention is not impaired, crystalline polyolefins such as high-density polyethylene, high-pressure-processed low-density polyethylene, linear low-density polyethylene and polypropylene, and/or other various polymers such as natural rubber, synthetic rubbers and styrene-based thermoplastic elastomers may be added thereto.

The thermoplastic elastomer composition of the present invention can be formed by blending the aforesaid ethylene-α-olefin copolymer (A) intimately with the aforesaid ethylene-α-olefin copolymer rubber (B).

The blending may be carried out according to any well-known method. Typical examples of such methods include mechanical melt-kneading methods using single-screw or double-screw extruders, Banbury mixers, various types of kneaders and roll mills. Alternatively, the components may also be blended by dissolving them in a solvent.

If desired, various fillers such as carbon black, calcium carbonate, silica, metallic fibers and carbon fiber and/or additives such as antioxidants, flame retarders and colorants may be added before or after the blending, or during the blending (especially during the melt-kneading). Moreover, in order to impart more excellent thermal resistance and oil resistance to the thermoplastic elastomer composition of the present invention, the blend obtained by blending the ethylene-α-olefin copolymer (A) intimately with the ethylene-α-olefin copolymer rubber (B) in the aforesaid proportion may further be partially cross-linked with the aid of a cross-linking agent.

The cross-linked composition can be prepared according to any well-known method. Typically, this can be accomplished by adding a cross-linking agent to the aforesaid blend and then melt-kneading the blend. For this purpose, there may used single-screw or double-screw extruders, Banbury mixers, various types of kneaders and roll mills. The melt-kneading is generally carried out at a temperature of 300° C. or below, and preferably at such a temperature, usually in the range of 100° to 300° C., as to render the half-life period of the cross-linking agent equal to or shorter than 1 minute. Alternatively, after a cross-linking agent is mixed by, for example, impregnation, the blend may be partially cross-linked by the use of heat or radiation.

Usually, an organic peroxide is used as the cross-linking agent. Specific examples thereof include 2,5-dimethyl-2,5-di(tert-butyl peroxy)hexane, di-tert-butyl peroxide, di(tert-butyl peroxy)diisopropylbenzene, di(tert-butyl peroxy)diisobutylbenzene, dicumyl peroxide, tert-butylcumyl peroxide, tert-butyl peroxybenzoate, 1,1-bis(tert-butyl peroxy)-3,3,5-trimethyl peroxide, benzoyl peroxide and p-chlorobenzoyl peroxide. In addition, a cross-linking aid may be used concomitantly. Specific examples thereof include liquid polybutadiene, divinylbenzene, ethylene dimethacrylate and diaryl phthalate.

The cross-linking agent is used in an amount of 0.005 to 3% by weight and preferably 0.05 to 1.0% by weight. However, the amount of cross-linking agent used is not necessarily limited to the aforesaid range because it depends on the performance desired for the cross-linked composition. Moreover, a number of cross-linking agents and/or cross-linking aids may be used in combination according to the intended purpose.

As to the thermoplastic elastomer composition partially corss-linked in the above-described manner, the boiling-xylene-insoluble fraction (or gel fraction) as determined by extraction with boiling xylene for 5 hours should preferably be from 0.5 to 60% by weight, and more preferably from 2 to 50% by weight. If the gel fraction is less than 0.5% by weight, the composition will show a reduction in oil resistance, and fail to exhibit the effects of cross-linking, while if the gel fraction is greater than 60% by weight, the composition will undesirably show a reduction in tensile strength and elongation.

Also with the partially cross-linked thermoplastic elastomer composition of the present invention, various fillers such as carbon black, calcium carbonate, silica, metallic fibers and carbon fiber and/or additives such as antioxidants, flame retarders and colorants may be added, as desired, before or after the cross-linking, or during the cross-linking (especially during the melt-knhading).

The thermoplastic elastomer compositions of the present invention have the following properties:
(1) They are highly flexible.
(2) Because of their good fluidity, they can be readily molded to yield molded articles having an attractive appearance.
(3) They have excellent thermal resistance and oil resistance. This tendency is especially pronounced when they are partially cross-linked.
(4) They have high tensile strength and tensile elongation.
(5) They have low permanent set and are hard to deform.
(6) They have good transparency.
(7) They have low density and are very light in weight.

Because of the aforesaid excellent properties, the thermoplastic elastomer compositions of the present invention have very wide applications. Typical applications of the thermoplastic elastomer compositions of the present invention include, for example, (a) automobile lining sheets, mudguards, moldings and covers,
(b) wire covering materials,
(c) parts of various electrical appliances,
(d) hoses,
(e) various types of packings,
(f) window frame seals,
(g) sound insulating materials,
(h) modifiers for various polymers.

The present invention is further illustrated by the following examples. However, these examples are not to be construed to limit the scope of the invention. In the following examples and comparative examples, the evaluation of properties was made according to the procedures given below.

[Measurement of Tm by DSC]

An approximately 5-mg sample was cut out of a hot-pressed film 100 μm thickness, accurately weighed, and mounted in a DSC apparatus. This sample was heated to 170° C., held at that temperature for 15 minutes, and cooled to 0° C. at a rate of 2.5° C./min. Starting from this state, the sample was tested by heating to 170° C. at a rate of 10° C./min. Then, its Tm was defined as the temperature corresponding to the top of the highest peak out of the peaks which appeared in the course of heating from 0° C. to 170° C.

[Determination of the boiling-n-hexane-insoluble fraction]

A sheet 200 μm thickness was formed using a hot press, and three specimens measuring 20 mm by 30 mm were cut out. Using a double-tubular Soxhlet extractor, each specimen was extracted with boiling n-hexane for 5 hours. The n-hexane-insoluble residue was removed, vacuum-dried at 50° C. for 7 hours, and weighed. Then, the boiling-n-hexane-insoluble fraction ($C_6$-insoluble fraction) of the specimen was calculated according to the following equation.

Boiling-n-hexane-insoluble fraction (wt. %) =

$$\frac{\text{Weight of extracted sheet}}{\text{Weight of unextracted sheet}} \times 100$$

[Formation of a testing sheet]

A resin composition was charged into a mold measuring 150 mm × 150 mm × 2 mm (thick), preheated at 210° C. for 5 minutes, pressed at that temperature and a pressure of 150 kg/cm² for 5 minutes, and then cooled at 30° C. and 150 kg/cm² for 10 minutes. The resulting sheet was annealed at 50° C. for 20 hours, allowed to stand at room temperature for 24 hours, and then used in the evaluation of properties.

[Flow parameter: FP]

$$FP = \frac{\text{Melt index at 230° C. under a load of 21.6 kg}}{\text{Melt index at 230° C. under a load of 2.16 kg}}$$

Greater values of FP indicate better fluidity at the time of molding.

[Tensile test]

A No. 3 dumbbell specimen was prepared according to JIS K6301 and tested at a pulling rate of 50 mm/min.

[Permanent set]

A No. 3 dumbbell specimen was prepared according to JIS K6301. The specimen was stretched by 100%, held in the stretched state for 10 minutes, contracted abruptly, and then allowed to stand for 10 minutes. Its permanent set was given by the residual elongation.

[Vicat softening point]

A specimen 3 mm thick was prepared and tested according to the procedure for the formation of a testing sheet. The specimen was placed in a heating bath and a needle-like indenter was vertically disposed thereon. While a load of 1 kg was applied to the indenter, the heat-transfer medium was heated at a rate of 50° C./min. The Vicat softening point of the specimen was given by the temperature of the heat-transfer medium at which the indenter penetrated thereinto by 1 mm.

[Hardness]

A specimen was prepared according to JIS K6301 and tested with an A type hardness tester.

[Oil resistance]

A specimen was prepared according to JIS K6301, exposed to JIS No. 3 oil at 70° C. for 22 hours and its volume change was measured.

[Gel fraction]

A sheet 200 μm thick was formed using a hot press (200° C., 5 minutes). Three specimens measuring 40 mm by 30 mm were cut out, and each of them was placed in a bag made of 120-mesh wire netting. Using a double-tubular Soxhlet extractor, each specimen was extracted with boiling xylene for 5 hours. The xylene insoluble residue was removed, vacuum-dried at 80° C. for 7 hours, and weighed. The gel fraction of the specimen was given by its boiling-xylene-insoluble fraction.

EXAMPLE 1

Using a catalyst consisting of (1) a solid catalyst component formed from substantially anhydrous magnesium chloride, 1,2-dichloroethane and titanium tetrachloride, and (2) triethylaluminum, ethylene was copolymerized with butene-1 to obtain an ethylene-butene-1 copolymer.

This ethylene-butene-1 copolymer had an ethylene content of 88.3 mole %, a melt index of 0.9 g/10 min., a density of 0.896 g/cm³, a maximum peak temperature of 119.8° C. as measured by DSC, and a boiling-n-hexane-insoluble fraction of 82% by weight.

Separately, using a vanadyl trichloridee-thylaluminum sesquichloride catalyst, ethylene was copolymerized with propylene and ethylidenenorbornene (ENB) to obtain a copolymer rubber. This copolymer rubber had a Mooney viscosity ($ML_{1+4}$, 100° C.) of 90, a propylene content of 27% by weight, a density of 0.863 g/cm³, and an ENB content of 16 as expressed in terms of iodine value.

20 g of the aforesaid ethylene-butene-1 copolymer, 20 g of the aforesaid ethylene-propylene-ENB copolymer rubber, 0.1 part by weight of di(tert-butyl peroxy)dipropylbenzene as a cross-linking agent, 0.1 part by weight of Irganox 1010 (an antioxidant commercially available from Ciba-Geigy Co.), and 0.1 part by weight of calcium stearate as a lubricant were dry-blended. The amounts of the last three ingredients are expressed in parts by weight per 100 parts by weight of the whole polymer. The resulting blend was charged into a Banbury mixer (manufactured by Brabender Co. and having a capacity of 60 ml) preheated to 200° C., and kneaded at a rotor speed of 40 r.p.m. for 10 minutes to obtain a thermoplastic elastomer composition. The results of evaluation of various properties thereof are shown in Table 1.

EXAMPLE 2

An elastomer composition was obtained in the same manner as described in Example 1, except that the amounts of the ethylene-n-butene-1 copolymer and the ethylene-propylene-ENB copolymer rubber were changed to 10 g and 30 g, respectively. The results of evaluation thereof are shown in Table 1.

EXAMPLE 3

An elastomer composition was obtained in the same manner as described in Example 1, except that the amounts of the ethylene-n-butene-1 copolymer and the ethylene-propylene-ENB copolymer rubber were changed to 30 g and 10 g, respectively. The results of evaluation thereof are shown in Table 1.

EXAMPLE 4

An elastomer composition was obtained in the same manner as described in Example 1, except that the amount of the cross-linking agent was changed to 0.3 part by weight. The results of evaluation thereof are shown in Table 1.

EXAMPLE 5

An elastomer composition was obtained in the same manner as described in Example 2, except that the amount of the cross-linking agent was changed to 0.3 part by weight. The results of evaluation thereof are shown in Table 1.

EXAMPLE 6

An elastomer composition was obtained in the same manner as described in Example 3, except that the amount of the cross-linking agent was changed to 0.05 part by weight. The results of evaluation thereof are shown in Table 1.

EXAMPLE 7

An ethylene-propylene copolymer rubber was prepared using a vanadyl trichloride-ethylaluminum sesquichloride catalyst. This copolymer rubber had a Mooney viscosity ($ML_{1+4}$, 100° C.) of 73, a propylene content of 26% by weight, and a density of 0.862 g/cm$^3$.

An elastomer composition was obtained in the same manner as described in Example 1, except that the aforesaid ethylene-propylene copolymer was used in place of the ethylene-propylene-ENB copolymer prepared in Example 1. The results of evaluation thereof are shown in Table 1.

EXAMPLE 8

Using a catalyst consisting of (1) a solid catalyst component formed from substantially anhydrous magnesium chloride, anthracene and titanium tetrachloride, and (2) triethylaluminum, ethylene was copolymerized with propylene to obtain an ethylene-propylene copolymer. This ethylene-butene-1 copolymer had an ethylene content of 85.5 mole %, a melt index of 1.0 g/10 min., a density of 0.890 g/cm$^3$, a maximum peak temperature of 121.6° C. as measured by DSC, and a boiling-n-hexane-insoluble fraction of 58% by weight.

An elastomer composition was obtained in the same manner as described in Example 1, except that the aforesaid ethylene-propylene copolymer was used in place of the ethylene-butene-1 copolymer prepared in Example 1. The results of evaluation thereof are shown in Table 1.

EXAMPLES 9 to 13

Elastomer compositions were obtained in the same manner as described in Examples 1, 2, 3, 7 and 8, except that no cross-linking agent was used in the respective examples. The results of evaluation thereof are shown in Table 2.

COMPARATIVE EXAMPLE 1

An elastomer composition was obtained in the same manner as described in Example 1, except that a propylene homopolymer (with a MFI of 0.7 g/10 min) was used in place of the ethylene-butene-1 copolymer prepared in Example 1. The results of evaluation thereof are shown in Table 3.

COMPARATIVE EXAMPLE 2

An elastomer composition was obtained in the same manner as described in Example 1, except that a ethylene-butene-1 copolymer having a melt index of 1.0 g/10 min, a density of 0.920 g/cm$^3$, a maximum peak temperature of 124° C. as measured by DSC, and a boiling-n-hexane-insoluble fraction of 97% by weight (Linirex, trade name, commercially available from Nippon Petrochemicals Co.) was used in place of the ethylene-butene-1 copolymer prepared in Example 1. The results of evaluation thereof are shown in Table 3.

COMPARATIVE EXAMPLE 3

An elastomer composition was obtained in the same manner as described in Comparative Example 2, except that no cross-linking agent was used. The results of evaluation thereof are shown in Table 3.

COMPARATIVE EXAMPLE 4

An elastomer composition was obtained in the same manner as described in Example 1, except that a propylene-ethylene copolymer having a melt index of 0.7 g/10 min (and an ethylene content of 5.9 mole %) was used in place of the ethylene-butene-1 copolymer prepared in Example 1. The results of evaluation thereof are shown in Table 3.

COMPARATIVE EXAMPLE 5

Various properties of the ethylene-butene-1 copolymer prepared in Example 1 were evaluated by testing it alone. The results of evaluation are shown in Table 3.

COMPARATIVE EXAMPLE 6

Various properties of the ethylene-propylene-ENB copolymer rubber prepared in Example 1 were evaluated by testing it alone. The results of evaluation are shown in Table 3.

As is evident from the above-described results, the thermoplastic elastomer compositions of the present invention have high flexibility, excellent tensile elongation and permanent set, and a well-balanced combination of other properties. Moreover, the compositions obtained by partial cross-linking of the two components with the aid of a cross-linking agent have particularly excellent thermal resistance and oil resistance.

TABLE 1

Thermoplastic

TABLE 1-continued

| Example No. | Hard segment (A) | | | | | Soft segment (B) | | elastomer composition | |
|---|---|---|---|---|---|---|---|---|---|
| | Monomer[*1] | MI (g/10 min.) | Density (g/cm$^3$) | Tm (°C.) | C$_6$-insoluble fraction (wt. %) | Monomer[*1] | Mooney viscosity ML$_{1+4}$ (100° C.) | Weight ratio of (A)/(B) | Organic peroxide (pbw) |
| 1 | C$_2'$-C$_4'$—1 | 0.9 | 0.896 | 119.8 | 82 | C$_2'$-C$_3'$—ENB | 90 | 50/50 | 0.1 |
| 2 | " | " | " | " | " | " | " | 25/75 | " |
| 3 | " | " | " | " | " | " | " | 75/25 | " |
| 4 | " | " | " | " | " | " | " | 50/50 | 0.3 |
| 5 | " | " | " | " | " | " | " | 25/75 | " |
| 6 | " | " | " | " | " | " | " | 75/25 | 0.05 |
| 7 | " | " | " | " | " | C$_2'$-C$_3'$ | 73 | 50/50 | 0.1 |
| 8 | C$_2'$-C$_3'$ | 1.0 | 0.890 | 121.6 | 58 | C$_2'$-C$_3'$—ENB | 90 | " | 0.1 |

| Example No. | Thermoplastic elastomer composition | | | | | | | | |
|---|---|---|---|---|---|---|---|---|---|
| | MFI[*2] (g/10 min.) | FP | Tensile strength (kg/cm$^2$) | Elongation (%) | Permanent set (%) | Vicat softening point (°C.) | Hardness (JISA) | Oil resistance (%) | Gel fraction (wt. %) |
| 1 | 0.05 | 470 | 90 | 740 | 14 | 41 | 78 | +154 | 26 |
| 2 | 0.003 | 730 | 61 | 700 | 10 | Penetrated at room temp. | 67 | +191 | 29 |
| 3 | 0.10 | 260 | 109 | 810 | 18 | 53 | 87 | +100 | 15 |
| 4 | 0.001 | 2500 | 79 | 550 | 14 | 43 | 75 | +139 | 41 |
| 5 | 0.001 | 700 | 43 | 380 | 8 | Penetrated at room temp. | 67 | +176 | 50 |
| 6 | 0.38 | 180 | 127 | 910 | 18 | 52 | 87 | +96 | 3 |
| 7 | 0.10 | 150 | 43 | 550 | 18 | 39 | 78 | +168 | 12 |
| 8 | 0.08 | 400 | 51 | 680 | 14 | 39 | 70 | +165 | 25 |

[*1]C$_2'$: Ethylene, C$_4'$-1: Butene-1, ENB: Ethylidenenorbornene.
[*2]Melt flow index as measured at 230° C. under a load of 2.16 kg according to JIS K6760.

TABLE 2

| Example No. | Hard segment (A) | | | | | Soft segment (B) | |
|---|---|---|---|---|---|---|---|
| | Monomer[*1] | MI (g/10 min.) | Density (g/cm$^3$) | Tm (°C.) | C$_6$-insoluble fraction (wt. %) | Monomer[*1] | Mooney viscosity ML$_{1+4}$ (100° C.) |
| 9 | C$_2'$-C$_4'$—1 | 0.9 | 0.896 | 119.8 | 82 | C$_2'$-C$_3'$—ENB | 90 |
| 10 | " | " | " | " | " | " | " |
| 11 | " | " | " | " | " | " | " |
| 12 | " | " | " | " | " | C$_2'$-C$_3'$ | 73 |
| 13 | C$_2'$-C$_3'$ | 1.0 | 0.890 | 121.6 | 58 | C$_2'$-C$_3'$—ENB | 90 |

| Example No. | Thermoplastic elastomer composition | | | | | | | |
|---|---|---|---|---|---|---|---|---|
| | Weight ratio or (A)/(B) | MFI[*2] (g/10 min.) | FP | Tensile strength (kg/cm$^2$) | Elongation (%) | Permanent set (%) | Vicat softening point (°C.) | Hardness (JISA) | Oil resistance (%) |
| 9 | 50/50 | 0.89 | 47 | 110 | 1100 | 14 | 39 | 76 | +196 |
| 10 | 25/75 | 0.75 | 43 | 90 | 1250 | 9 | Penetrated at room temp. | 66 | +235 |
| 11 | 75/25 | 0.70 | 63 | 150 | 970 | 19 | 50 | 87 | +151 |
| 12 | 50/50 | 1.6 | 40 | 48 | 750 | 18 | 39 | 78 | +191 |
| 13 | " | 1.3 | 38 | 55 | 910 | 14 | Penetrated at room temp. | 71 | +210 |

[*1], [*2] See notes for Table 1.

TABLE 3

| Comparative Example No. | Hard segment (A) | | | | | Soft segment (B) | | Thermoplastic elastomer composition | |
|---|---|---|---|---|---|---|---|---|---|
| | Monomer[*1] | MI (g/10 min.) | Density (g/cm$^3$) | Tm (°C.) | C$_6$-insoluble fraction (wt. %) | Monomer[*1] | Mooney viscosity ML$_{1+4}$ (100° C.) | Weight ratio of (A)/(B) | Organic peroxide (pbw) |
| 1 | C$_3'$[*3] | 0.7[*4] | 0.901 | 158.0 | 99 | C$_2'$-C$_3'$—ENB | 90 | 50/50 | 0 |
| 2 | C$_2'$-C$_4'$—1 | 1.0 | 0.920 | 124.0 | 97 | " | " | " | 0 |
| 3 | " | " | " | " | " | " | " | " | 0.1 |
| 4 | C$_3'$-C$_2'$ | 0.7 | 0.905 | 158.0 | — | " | " | " | 0.1 |
| 5 | C$_2'$-C$_4'$—1 | 0.9[*4] | 0.896 | 119.8 | 82 | — | — | 100/0 | 0 |
| 6 | — | — | — | — | — | C$_2'$-C$_3'$—ENB | 90 | 0/100 | 0 |

| Comparative Example No. | Thermoplastic elastomer composition | | | | | | | | |
|---|---|---|---|---|---|---|---|---|---|
| | MFI[*2] (g/10 min.) | FP | Tensile strength (kg/cm$^2$) | Elongation (%) | Permanent set (%) | Vicat softening point (°C.) | Hardness (JISA) | Oil resistance (%) | Gel fraction (wt. %) |

TABLE 3-continued

| | | | | | | | | | |
|---|---|---|---|---|---|---|---|---|---|
| 1 | 0.45 | 115 | 180 | 480 | 53 | 68 | 100 | +145 | 0 |
| 2 | 0.71 | 31 | 130 | 740 | 29 | 48 | 92 | +161 | 0 |
| 3 | 0.02 | 380 | 120 | 530 | 26 | 48 | 93 | +153 | 24 |
| 4 | 0.06 | 290 | 44 | 390 | 20 | 55 | 85 | +198 | 8 |
| 5 | 2.1 | 35 | 190 | 940 | 35 | 66 | 95 | +52 | 0 |
| 6 | 0.35 | 34 | 37 | 890 | 11 | Penetrated at room temp. | 60 | +305 | 0 |

*¹, *²See notes for Table 1.
*³Propylene homopolymer.
*⁴Measured at 230° C.

What is claimed is:

1. A thermoplastic elastomer composition comprising
(A) 25 to 75% by weight of an ethylene-α-olefin copolymer formed by copolymerizing ethylene with an α-olefin having 3 to 12 carbon atoms in the presence of a catalyst consisting of (1) a solid component containing at least magnesium and titanium, and (2) an organoaluminum compound, said ethylene-α-olefin copolymer being characterized by
(I) a melt index of 0.01 to 100 g/10 min,
(II) a density of 0.870 to 0.900 g/cm³,
(III) a maximum peak temperature of not lower than 100° C. as measured by differential scanning calorimetry (DSC), and
(IV) a boiling-n-hexane-insoluble fraction of not less than 10% by weight; and
(B) 75 to 25% by weight of an ethylene-α-olefin copolymer rubber having a maximum peak temperature, if any, as measured by DSC of at most 60° to 70° C. and having no or very little boiling -n- hexane-insoluble fraction.

2. A thermoplastic elastomer composition as claimed in claim 1 wherein said ethylene-α-olefin copolymer (A) is formed from an α-olefin having 3 to 6 carbon atoms.

3. A thermoplastic elastomer composition as claimed in claim 1 wherein said ethylene-α-olefin copolymer (A) contains 5 to 40 mole % of said α-olefin.

4. A thermoplastic elastomer composition as claimed in claim 1 wherein said ethylene-α-olefin copolymer rubber (B) has a Mooney viscosity of 10 to 120.

5. A thermoplastic elastomer composition obtained by partial cross-linking of a blend comprising (A) 25 to 75% by weight of an ethylene-α-olefin copolymer formed by copolymerizing ethylene with an α-olefin having 3 to 12 carbon atoms in the presence of catalyst consisting of (1) a solid component containing at least magnesium and titanium, and (2) an organoaluminum compound, said ethylene-α-olefin copolymer being characterized by
(I) a melt index of 0.01 to 100 g/10 min,
(II) a density of 0.870 to 0.900 g/cm³,
(III) a maximum peak temperature of not lower than 100° C. as measured by differential scanning calorimetry (DSC), and
(IV) a boiling-n-hexane-insoluble fraction of not less than 10% by weight; and
(B) 75 to 25% by weight of an ethylene-α-olefin copolymer rubber having a maximum peak temperature, if any, as measured by DSC of at most 60° to 70° C. and having no or very little boiling-n-hexane-insoluble fraction.

6. A thermoplastic elastomer composition as claimed in claim 5 wherein said ethylene-α-olefin copolymer (A) is formed from an α-olefin having 3 to 6 carbon atoms.

7. A thermoplastic elastomer composition as claimed in claim 5 wherein said ethylene-α-olefin copolymer (A) contains 5 to 40 mole % of said α-olefin.

8. A thermoplastic elastomer composition as claimed in claim 5 wherein said ethylene-α-olefin copolymer rubber (B) has a Mooney viscosity of 10 to 120.

9. A thermoplastic elastomer composition as claimed in claim 5 wherein said blend is partially cross-linked by the addition of a cross-linking agent comprising 0.005 to 3% by weight of an organic peroxide.

* * * * *